United States Patent [19]

Yamanaka

[11] Patent Number: 4,831,388

[45] Date of Patent: May 16, 1989

[54] ELAPSED TIME RECORDER

[75] Inventor: Atsuko Yamanaka, Kyoto, Japan

[73] Assignee: Kabushiki Kaisha Yamanakaya, Kyoto, Japan

[21] Appl. No.: 83,388

[22] Filed: Aug. 10, 1987

[30] Foreign Application Priority Data

Jan. 13, 1987 [JP] Japan .............................. 62-4085[U]

[51] Int. Cl.⁴ ...................... G01D 15/04; G01D 15/20

[52] U.S. Cl. ........................................ 346/95; 346/80; 346/82

[58] Field of Search .......................... 346/95, 80, 82–8

[56] References Cited

U.S. PATENT DOCUMENTS 2,591,448 4/1952 Lorenz ................................. 346/95

3,789,424 1/1974 Matorino ............................. 346/95

4,494,127 1/1985 King .................................. 346/134

*Primary Examiner*—E. A. Goldberg

*Assistant Examiner*—Lincoln Donovan

*Attorney, Agent, or Firm*—Armstrong, Nikaido Marmelstein Kubovcik & Murray

[57] ABSTRACT

An elapsed time recorder comprising an entrance recorder installed at the entrance for printing the entry time on a time card and simultaneously coding this entry time and printing the coded entry time on the time card, and an exit recorder installed at the exit for printing the exit time on the time card carried to the exit and simultaneously reading the coded entry time recorded on the time card, computing the elapsed time or the difference between the entry time and the exit time and printing the time difference on the time card.

8 Claims, 3 Drawing Sheets

ELAPSED TIME RECORDER

BACKGROUND OF THE INVENTION

Field of the Invention

The present invention relates to a device for recording the elapsed time from the time of entry to the time of exit, used in a recreation hall or the like which provides a game in which a player passes through a complicated maze defined by wooden walls.

Recently, there has been devised and implemented a game, called a "grandmaze," in which a recreation hall is partitioned by about 2-meter high wooden walls to define a complicated maze for players to pass therethrough from the entrance via predetermined points to the exit.

Thus, since this game has a remarkable element of competition against the time required for passage, a recorder which records the time required is necessary.

When a conventional time recorder is used for this purpose, it has been only possible to print the entry time and exit time in hours and minutes (not possible in seconds) on time cards carried by players as admission tickets.

What must be recorded in this game is the time required in passage. Because of the nature of the game competing against elapsed time, it must be recorded on a time card clearly and the unit of time must be the second. However, conventional time recorders have no such function To solve the above problem, it is essential, besides expressing time in seconds, for the recorder at the exit to identify players and find their points of time of entry.

To this end, there could be contemplated a method which comprises printing different identification numbers on different time cards which serve as admission tickets, wherein when a player inserts his time card into the time recorders at the entrance and the exit, he is required to input his identification number through the ten-key pad. In this case, the printed entry time and the identification number are stored as a set in the input recorder and this stored data is transmitted to the output recorder. However, this makes it necessary to provide an exclusive storage device and a transmission line connecting the input and output recorders. Forcing players to input their identification numbers into the recorders in this manner is extremely unsuitable when the condition that this recreation hall is utilized by children as well is taken into consideration. Further the provision of an exclusive storage device and a transmission line poses a new problem that the cost of equipment increases.

SUMMARY OF THE INVENTION

The present invention, which has been accomplished with the above-mentioned problems in mind, provides an elapsed time recorder comprising an entrance recorder installed at the entrance for printing the entry time on a time card and simultaneously coding this entry time and printing the coded entry time on the time card, and an exit recorder installed at the exit for printing the exit time on said time card carried to the exit and simultaneously reading the coded entry time recorded on said time card, computing the elapsed time or the difference between the entry time and the exit time and printing the time difference on said time card.

According to the invention, since the entry time is coded and stored in a time card itself carried by a visitor from the entrance to the exit, it follows that such time cad itself has the function of a storage medium and the function of data communication means. The exit recorder is capable of reading the entry time, computing and printing the elapsed time.

DESCRIPTION OF THE PREFERRED EMBODIMENTS

Figure 1:
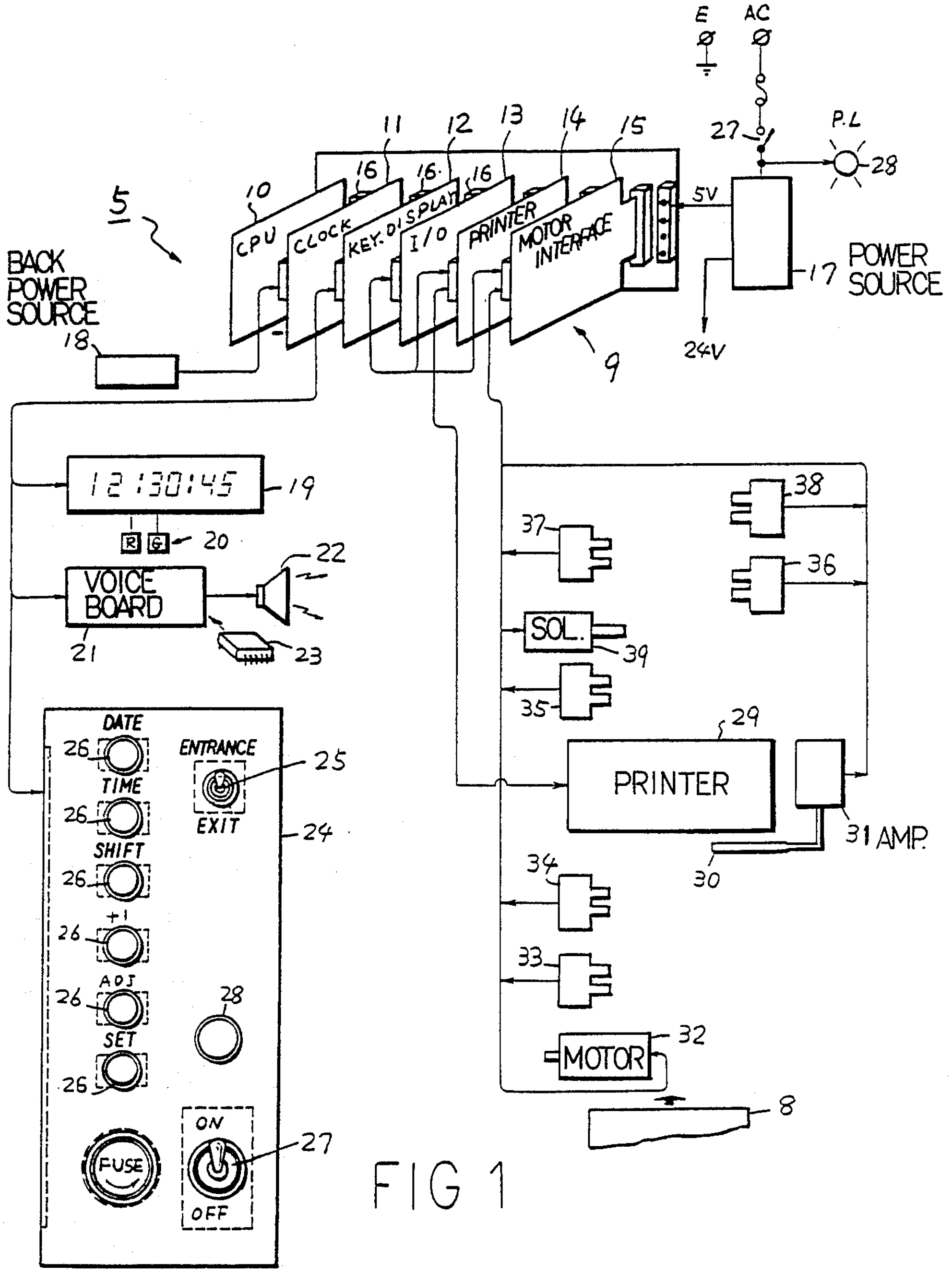
FIG. 1 is a view schematically showing the arrangement of the present inventive device.
Figure 2:
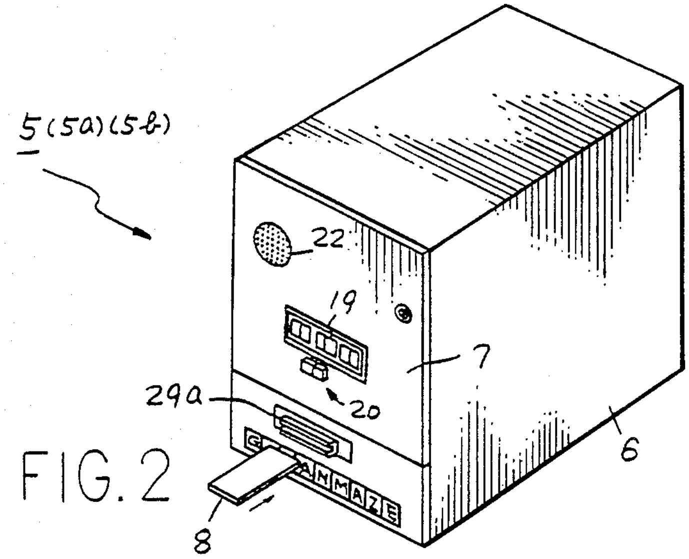
FIG. 2 is a perspective view of the present inventive device.
Figure 3:
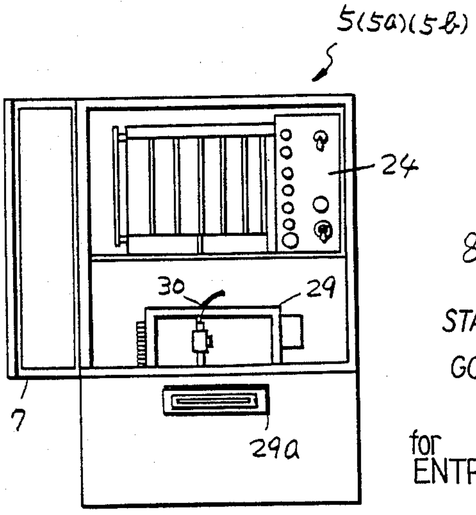
FIG. 3 is a front view showing the present inventive device with its front door opened.
Figure 4:
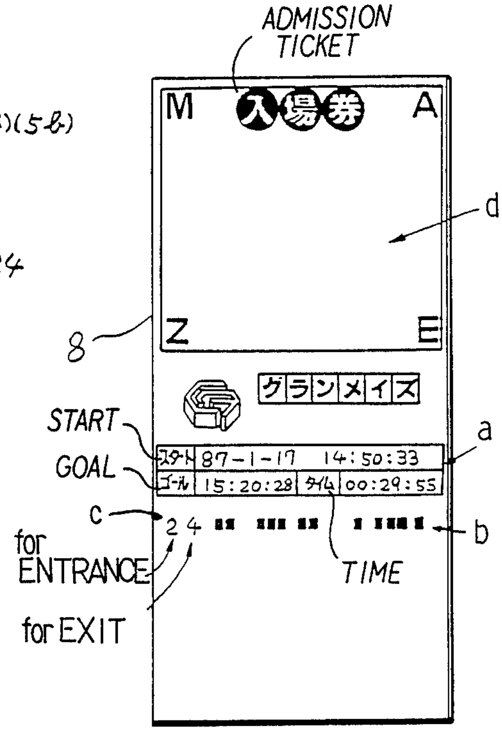
FIG. 4 is a plan view of a time card.

An embodiment of the invention will now be described. FIG. 1 schematically shows the arrangement of a recorder which can be used both for the entrance and for the exit. This recorder 5 is housed in a box-like case 6 as shown in FIG. 2. The upper portion of the front of the case provides a door 7 which is opened for adjustment, as shown in FIG. 3. As shown in FIG. 4, a time card 8 to be carried by a visitor in the hall has a predetermined time print section a and a mark code record section b.

Figure 5:
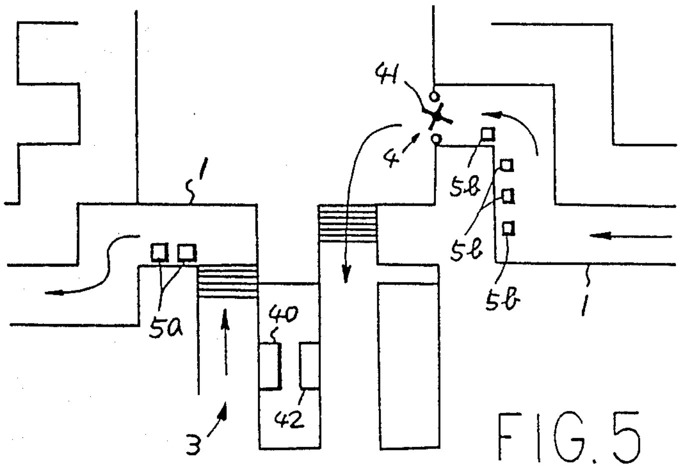
FIG. 5 is a plan view showing regions in the vicinity of the entrance and exit of a recreation hall where the present inventive device is installed.

The recorder 5 is constructed for use as an entrance recorder 5*a* or an exit recorder 5*b* and, as shown in FIG. 5, such recorders are installed in the vicinity of the entrance 3 and exit 4 of the recreation hall.

In FIG. 1, the numeral 9 denotes a control section comprising a CPU 10, a clock circuit 11, a key display circuit 12, an input/output circuit 13, a printer control 14 and a motor interface 15, all components being assembled on respective printed circuit boards. These components are connected to a common bus line and a power source line through edge board connectors 16. The numeral 17 denotes a power source section which supplies a voltage of 5 V for the control section and a voltage of 24 V for the mechanical section. The numeral 18 denotes a backup power source for the clock circuit; a dry battery or nickel cadmium battery is used. The numeral 19 denotes a digital indicator for indicating the present time, and 20 denotes an LED indicator lamp which indicates whether it is possible or not to insert the time card 8, by lighting a green lamp or a red lamp. The numeral 21 denotes a voice board and 22 denotes a speaker, said voice board 22 having replaceably mounted thereof a voice ROM 23 in which quantized voice is stored. The numeral 24 denotes a setting panel having mounted thereon an operation mode setting switch 25 for determining whether this recorder 5 is to be used for the exit or for the entrance, push-button switches 26 for setting the date and the hour for the clock circuit 11, a power switch 27, and an operation indicator lamp 28. The numeral 29 denotes a printer mechanism; 30 denotes a flexible fiber sensor fixed at the front end thereof to the printing head of the printer mechanism 29; and 31 denotes a mark reader which projects and receives light by means of light projecting and receiving elements at the proximal end of the fiber sensor so as to detect the presence or absence of a mark on the time card opposed to the front end of the fiber sensor 30. The numeral 32 denotes a motor for taking the time card 8 into and out of the printer mechanism. The numerals 33 through 34 denote photosensors for detecting the position of the tie card 8 within the printer mechanism, 33 being used for confirmation of insertion of a card, 34 for confirmation of the taking-out of the card, 35 for detection of the mark reading position, 36 for detection of the start time print position, 37 for detection of the print position at the time when the goal is passed through, and 38 for detection of the mark print position. The numeral 39 denotes a solenoid used for stopping the time card 8 at each print position.

The operation of the recorder 5 of the invention will now be described.

This recorder 5 is used both for the entrance and for the exit; thus, depending upon whether it is placed at the entrance or at the exit, its operation mode differs.

Therefore, before it is used, the door 7 in the upper portion of the front of the time recorder 5 is opened, as shown in FIG. 3, and the present time is set by operation of the push-button switches 26 and at the same time whether it is to be used for the entrance or the exit is determined by the setting switch 25. In addition, even if the digital indicator 19 goes off when the power switch 27 is turned off at the closing hour, the clock circuit 11 is continuing its clock operation by means of the backup power source 18; thus, when the power switch 27 is turned on at the opening hour on the next day, the correct time will be indicated, so that there is no need for resetting.

Upon completion of such initial setting, business is opened. A player receives a new time card 8 at a box office 40 shown in FIG. 5. When he reaches an entrance recorder **5*a* installed in the vicinity of the entrance, he inserts the time card 8 into the card insertion port 29*a*, whereupon the card insertion confirming photosensor 33 detects the insertion. And the LED indicator lamp 20 lights red to indicate that the device is in operation, whereupon the motor 32 is rotated to draw the time card 8 into the printer mechanism 29. The front end of the card reaches the photosensor 36 for detecting the start time print position, and the photosensor 36 produces a detection output. Thereupon, the motor 32 is stopped and at the same time the solenoid 39 is actuated to stop the time card at that position. Under the control of the control section 9, the date and the time in hours and seconds, in the form, for example, 87-1-17 14:50:33, measured by the clock circuit 11 are printed on the upper line of the time print section a. Thereafter, the motor 32 starts further drawing the time card 8. When this is detected by the photosensor 38 for detecting the mark print position, the motor 32 is stopped and the solenoid 39 is actuated to stop the time card 8. The present time is coded on the basis of the binary-coded decimal system, for example, by the control section 9, and the printing head of the printer mechanism 29 is caused to print the code by using a black square mark for "1" and a blank mark for "0" on the mark code record section b of the time card 8 as shown in FIG. 4. At this time, one's own number is also printed using the numbers 1 through 9 at the head of the same line. In the case where respective pluralities of recorders 5*a* and 5*b* are installed side by side, this number is utilized to know which recorder it is associated with when the ink ribbon of the printer has been consumed to the extent that the print is too thin. At this ink ribbon consumption checking print position c, two numbers are printed one for each of the entrance and exit recorders, as shown in FIG. 4. After this printing operation, the motor 32 is rotated in the reverse direction to deliver the time card 8. When the time card 8 has passed by the photosensor 34, the motor 32 is stopped. And the speaker 22 produces such vocal sounds as "Hold out, good-by" with sound effects, on the basis of the data stored in the voice ROM 23 mounted on the voice board 21. When the player takes his time card 8 out of the card insertion port 29*a* of the printer mechanism 29, this taking-out is detected by the card insertion confirmation photosensor 33, whereupon the LED indicator lamp 20** changes to green, indicating that the device is ready to accept the next player's time card.

Figure 6:
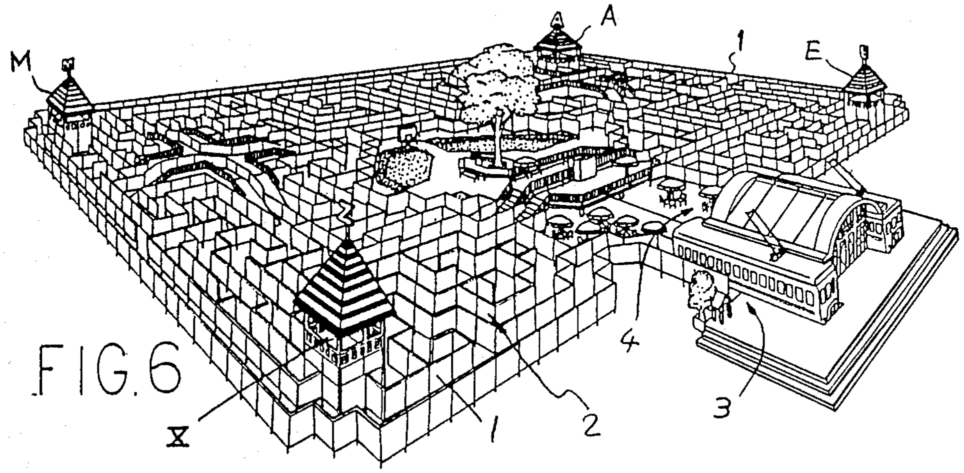
FIG. 6 is a complete perspective view of the recreation hall where the present inventive device is installed.

The player carrying with him the time card having the present time together with marks printed thereon goes into a maze 2 defined by wooden walls 1, as shown in FIG. 6. Whenever he reaches each of the predetermined points M, A, Z and E, he presses the furnished stamp on the stamp section d of the time card 8. In addition, this stamping is a rule for the game and has nothing to do with the operation of the present inventive device. When the player passes through the maze in this manner while exercising his imagination and memory, he comes to a row of exit recorders **5*a* installed in the vicinity of the exit as shown in FIG. 5. He then inserts the time card 8 into the card insertion port 29*a* of an exit recorder 5*b*. Thereupon, the motor 32 is rotated, so that the time card 8 is drawn until it reaches the detecting position of the mark reading position detecting photosensor 35. At this position, the printing head of the printer mechanism 29 makes one scan. At this time, no printing action takes place but the front end of the fiber sensor 30 which operates with the printing head optically scans the mark code record section b from a position about 1 mm apart. Thereby, the mark reading section 31 reads the marked code of the entry time and transfers its output to the control section 9. The control section 9 finds the entry time from this code and computes the elapsed time or the difference between the entry time and the present time determined by the clock circuit 11. Thereafter, the motor 32 starts rotating again and further draws the time card 8. When the time cards 8 is moved to the position of the elapsed time print position detecting photosensor 37, the motor 32 is stopped and at the same time the solenoid 39 is actuated to stop the time card 8. In response to a signal from the control section 9, the printer mechanism 29 prints the exit time (present time) and said elapsed time in the form 15:20:28 00:29:55, for example, on the lower line of the time print section a of the time card 8 shown in FIG. 4. Thereafter, the motor 32 is rotated again to further draw the time card 8, and at the detecting position of the mark print position detecting photosensor 38, the player's record number, for example, 4 is printed at the ink ribbon consumption checking print position c. Thereafter, the motor 32 is rotated in the reverse direction to start scanning, and when the time card 8 has passed by the confirmation photosensor 34, the motor 32 is stopped and the speaker 22 produces such vocal sounds as "Thank you, good-by" on the basis of the voice data stored in the voice ROM 23 mounted on the voice board 21. In addition, vocal sounds suitable for a particular player may be selected and produced on the basis of the size of the elapsed time decided by the control section 9**.

The player withdraws the time card 8 having the elapsed tim,, etc. printed thereon from the card insertion port 29*a* of the printer mechanism, and passing through a rotary gate 41 shown in FIG. 5, goes to the exit 4. And at a reception desk 42, he can have the predetermined procedure made with respect to the result of the game.

In the above embodiment, the recording of the entry time on the time card 8 by the mark code has been effected by utilizing the printing function of the printer mechanism and the reading thereof has been effected by the fiber sensor 30 having the front end thereof fixed to the printing head; therefore, there has been attained a merit that the arrangement is extremely simplified. However, recording and reading on the basis of a mark code is not limited to this embodiment. For example, a punched record may be optically read or a magnetic body may be applied to a portion of the time card so that recording and reading can be magnetically effected.

The recorder 5 in the above embodiment has been designed for use at both the entrance and the exit; however, exclusive recorders for the entrance and exit may be used.

As has so far been described, according to the invention, since the time card itself, which is carried by a visitor as an admission ticket, has the function of communication of the entry time, the entry time can be known at the exit and the elapsed time can be automatically printed. There is no need for a special operation such as the inputting o an identification code at the entrance and exit, and without any communication circuit used, it is possible to attain the function of an elapsed time recorder between the entrance and exist which are substantially spaced apart. Further, the present inventive device can be used, besides said grand-maze, in any other facilities which require time control based on the printing of elapsed time. In this case, the need of computing the elapsed time at the exit is eliminated, so that time control is facilitated.

What is claimed is:

1. An electronic elapsed time recording apparatus for use as an entrance or exit post, for printing and coding an entry time on a time card when operating as an entrance post, and for reading the entry time from the time card and computing and printing an elapsed time, between the entry time and an exit time, on the time card when operating as an exit post, said apparatus comprising:

a reading means for reading a coded entry time from the time card, said reading means including, (a) a fiber sensor means for projecting light onto the time card and transmitting a received reflection representing the coded enter time from the time card, and (b) a mark reader means for receiving the received reflection of the coded entry time from said fiber sensor means, and output in said entry time;

(c) a control means connected to said reading means for controlling the operation of said apparatus, including a clock circuit for outputting entry and exit times, and a computing circuit for computing the difference between said entry time received from said mark reader means and said exit time received from said clock circuit and outputting the result as an elapsed time; and a printing means, having a print head, for receiving said elapsed time from said computing circuit and for printing at least said elapsed time on the time card, and wherein said fiber sensor means is fixed to said print head.

2. The apparatus of claim 1, wherein said fiber sensor means comprises optical fibers.

3. The apparatus of claim 1, further comprising drive means connected to said control means for moving the time card into and out of said apparatus.

4. The apparatus of claim 3, further comprising photo sensors, connected to said control means, for detecting an insertion position of the time card in said apparatus.

5. The apparatus of claim 4, further comprising stop means, connected to said control means, for cooperating with said photo sensor to stop the time card at a predetermined insertion position.

6. The apparatus of claim 1, wherein the coded entry time is printed on the time card in BCD (Binary Coded Decimal) format

7. The apparatus of claim 1, wherein the coded entry time is magnetically encoded on the time card.

8. The apparatus of claim 1, wherein the coded entry time is punched into the time card.

* * * * *